United States Patent Office 3,444,279
Patented May 13, 1969

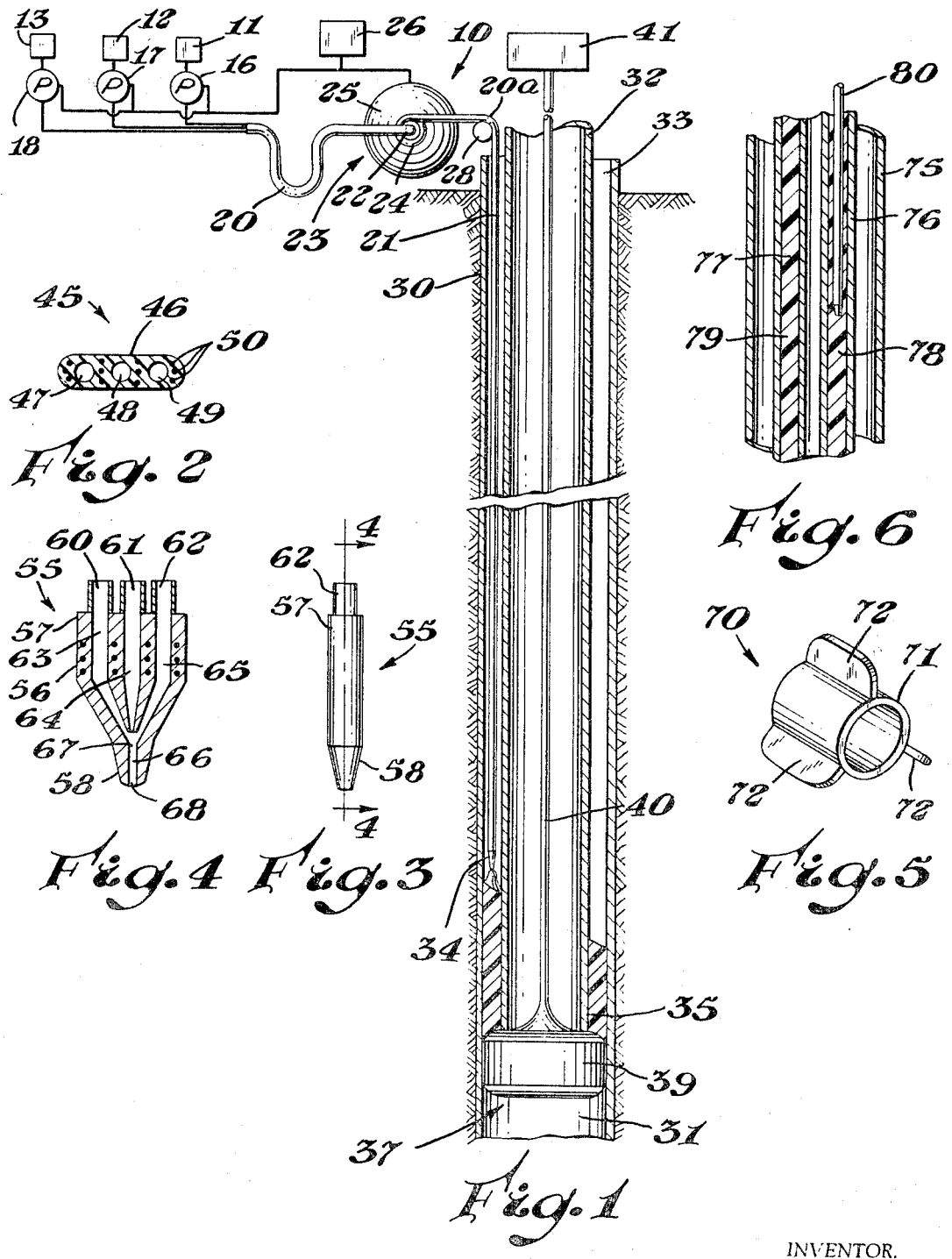

3,444,279
METHOD AND APPARATUS FOR THE
INSULATION OF CONDUIT
Raymond M. Dost, Sherwood Township, Branch County, Mich., assignor to The Dow Chemical Company, Midland, Mich., a corporation of Delaware
Filed May 9, 1966, Ser. No. 548,482
Int. Cl. B29h 7/20
U.S. Cl. 264—45                    4 Claims

ABSTRACT OF THE DISCLOSURE

Method and apparatus are disclosed for combining foamable resins in a remote location such as in the space between concentric pipes. The resin dispenser and mixer are withdrawn as foam is formed.

This invention relates to a method and apparatus for the insulation of conduit, and more particularly relates to the application of insulation to an annular space defined between generally concentric conduits.

The problem of insulation of conduits is one of long standing. Customarily, steam transmission lines or pipes are covered with an insulating means to prevent heat loss and assure the maximum transport of heat. Similarly, refrigeration lines are also wrapped or covered to prevent the acquisition of heat. Various shapes, forms and compositions have been employed for this purpose, including preformed insulation which may be readily placed in position about a line. Oftentimes, for purposes of mechanical protection or convenience, it is desirable to insulate the annular space defined between concentric pipes or conduits. Such an arrangement provides desirable mechanical protection for the thermally insulating material and beneficially, oftentimes provides an improved structural element. Such annular insulation has been accomplished by a variety of means, particularly in short lengths of concentric pipe. However, much difficulty has been encountered when long lengths of pipe must be insulated and subsequently joined. Generally, pipe is provided in lengths of about 21 or 30 feet and frequently it is desired to have several hundred or even several thousand feet of insulated line which comprises concentric tubes having a thermal insulating material disposed therebetween. In order to form such a line employing conventional known methods, it is generally necessary that the line be made up of many lengths of pipe. At each joint, insulating material and a portion of the outer line are removed; the inner line welded or connected in a conventional manner; insulation applied, and the outer casing replaced. Such a procedure is time consuming and costly and in some installations is impractical for many purposes. For example, long concentric lines are often positioned in the ground such as in oil wells and the like and it is desired to pass a heat exchange liquid or a heating or cooling liquid perhaps to a depth of several thousand feet. The thermal losses from the pipe or stream is oftentimes substantial, and indeed, on occasion, sufficient to reduce the efficiency of transferring the heat from the surface of the ground to the desired location to a sufficiently low degree that the operation is impractical. Oftentimes, even an above ground operation such as where a pipe line must conduct a material having a temperature substantially different than ambient temperature, the problem of constructing a double-walled conduit is substantial and involves considerable labor.

It is an object of this invention to provide an improved method and apparatus for the insulation of generally concentric conduits wherein an inner conduit has at least a major portion of its surface spaced from an outer conduit.

A further object of this invention is to provide an improved method and apparatus for providing thermal insulation within an annular space between generally concentric conduits of relatively great length, that is, in the excess of the length of pipe normally available and transportable.

A further object of this invention is to provide an improved method and apparatus for insulating concentric strings of tubing in a well bore.

These benefits and other advantages in accordance with the present invention are achieved in a method for the insulation of generally annular spaces between conduits; wherein a first conduit having an outer wall is disposed within a second conduit having an inner wall and a space is defined between the outer wall of the inner conduit and the inner wall of the outer conduit, the steps of the method comprising, disposing within the space defined between adjacent conduits a foamable hardenable liquid material at a predetermined rate; the foamable hardenable material being supplied by a foamable hardenable material discharge means; withdrawing the discharge means at a rate substantially in accordance with the rate of formation of a foam within the space defined between the two conduits.

Also contemplated within the scope of the present invention is an apparatus particularly adapted and suited for the formation of a foamed plastic insulating member defined within an elongated space. The apparatus comprising in cooperative combination at least a first fluid component supply means and a second fluid component supply means; a first fluid component forwarding means and a second fluid component forwarding means in operative connection with the first and second supply means respectively. The first and second fluid component formed means adapted to forward the first and second components at a predetermined proportion; a multiple passage conduit in operative communication with the first and second forwarding means, the multiple passage conduit having an inlet end and a discharge end; the inlet end of the conduit having at least one passage in communication with the first forwarding means and a second passage in operative communication with the second forwarding means, the discharge end of the multiple passage conduit defining a component mixing means whereby the first and second components are intimately admixed and discharged, the multiple passage conduit in operative communication with means to withdraw the conduit from a space at a predetermined rate, and means to control the first and second forwarding means to deliver the first and second components at a rate proportional to the rate of withdrawal of the conduit from the space.

Further features and advantages of the present invention will become more apparent from the specification taken in connection with the drawing wherein:

In FIGURE 1 there is schematically illustrated the apparatus and method of the present invention.

FIGURE 2 is a sectional representation of a component supply conduit of the apparatus of FIGURE 1.

FIGURES 3 and 4 depict two views of a mixing or dispensing nozzle suitable for use in the apparatus of FIGURE 1.

FIGURE 5 is a schematic representation of a spacing collar or spider for use in the practice of the present invention.

FIGURE 6 schematically depicts the insulation of the conduit within a casing.

In FIGURE 1 there is schematically represented an apparatus in accordance with the present invention generally designated by the reference numeral 10. The apparatus comprises in cooperative combination a first component supply means 11, a second component supply means 12, and a third component supply means 13. The component supply means 11, 12 and 13 are adapted to provide the liquid to form a foamable hardenable resinous mixture. The first, second and third supply means 11, 12 and 13 are in operative communication with a first, second and third forwarding and proportioning means or pumps 16, 17 and 18, respectively. By means of suitable conduits, the pumps 16, 17 and 18 in turn are in operative communication with a multiple passage conduit 20 having defined therein a plurality of separate passageways, not shown, adapted to receive the discharge from the proportioning pumps 16, 17 and 18. The conduit 20 terminates remote from the proportional pumps 16, 17 and 18 in a rotary joint 22. The rotary joint 22 is affixed to a conduit positioning means 23. The conduit positioning means has in operative combination therewith an elongated multiple opening conduit 20a. The conduit positioning means 23 has a drum 24 upon which the conduit 20a may be disposed in a generally helical manner. The positioning means 23 has a drive means or motor 25 adapted to rotate the drum 24 in a desired direction. A control means 26 is in operative connection with the drive means 25 and the pumps 16, 17 and 18. The control means 26 causes the pumps 16, 17 and 18 to deliver a predetermined volume of liquid components in proportion to the liner displacement of the conduit 20a as the conduit 20a is wound upon the drum 24. A support and measuring roll 28 supports the conduit 20a generally adjacent the drum 24 and beneficially is employed to provide a signal proportional to the lineal displacement of the conduit 20a on the surface thereof. A casing or tubing string 30 is disposed within the ground 21. The casing 30 defines an internal generally cylindrical space 31. A second conduit or tubing string 32 is disposed within the conduit 30. The string 32 in combination with the conduit 30 defines an internal annular space 33. The multiple passage conduit 20a extends downwardly into the annular space 33 and terminates in a dispensing nozzle 34. The conduit 32 has a terminal end 35 disposed within the cavity 31. A plug assembly 37 is disposed within the conduit or casing 30 generally adjacent the terminal end 35 of the conduit 32; the plug assembly comprises an expandable element 39 disposed adjacent the terminal end 35 of the conduit 32. The expandable element 39 is supported on a conduit 40 extending the length of the conduit 32 and in communication with a pressurized fluid source 41 positioned generally adjacent the apparatus 10. The fluid source 41 supplies fluid to selectively expand or contract the plug 39.

In FIGURE 2 there is schematically depicted a sectional view of a conduit 45 similar to the conduit 20a of FIGURE 1. The conduit 45 has an elongate cross-sectional configuration and comprises a body portion 46 having defined therein separate and spaced apart passageways 47, 48 and 49 and a plurality of reinforcing elements 50 such as high tensile strength steel wire.

FIGURES 3 and 4 depict a side view and a sectional view taken along the line 4—4 of FIGURE 3 of a dispensing and mixing nozzle generally designated by the reference numeral 55. The nozzle 55 is generally similar to the dispenser 34 of FIGURE 1. The nozzle 55 comprises a body portion 56 having an inlet end 57 and a discharge end 58. The body 56 defines first, second and third conduit engaging means 60, 61 and 62, respectively. The body 56 defines first, second and third passageways 63, 64 and 65 extending through the body and terminating within the conduit engaging means 60, 61 and 62 to provide communication with a multiple passage conduit. The conduits 63, 64 and 65 terminate adjacent the discharge end 58 in a mixing and discharge passageway 66. The discharge passageway 66 has a combined zone 67 adjacent the terminal portions of the passageways 63, 64 and 65 and a discharge opening 68 remotely disposed from the mixing zone 67.

In operation of the apparatus of the present invention as depicted in FIGURES 1–4, between conduits 32 and 33 a foam plastic insulation is desired. The plug assembly 37 is disposed adjacent the terminal end 35 of the conduit 32 and inflated to seal the portion of the annular space 33 adjacent the plug 39 and to prevent undesired fluids from rising from the position below the plug 39. Any liquid may then be pumped from the annular space 32 by suitable pumping means not shown. The conduit 20a is extended to a position generally adjacent the plug 39 and subsequently withdrawn at a predetermined rate by the conduit positioning means 23. Withdrawal of the conduit 20a by means of the proportional control 26 causes the pumps 16, 17 and 18 to deliver the components of a foamable, hardenable mixture at a predetermined rate sufficient to cause the annular space 32 to fill with a hardenable foamed material. The components are mixed and discharged at and from the nozzle 34. Thus, as the conduit 20a is continuously withdrawn from the annular space, hardenable foamable material is discharged into the annular space and foams and hardens to provide the desired insulation.

The particular rates employed will vary with the specific composition selected to form the insulation, the temperature of the components when they reach the discharge nozzle, and the temperature of the conduits themselves. Thus, where rapid foaming occurs, the conduit may be withdrawn more rapidly than in regions where less rapid foaming takes place. Dispersion of the foamable hardenable material should be maintained at a rate sufficient to provide in most cases as low a density foam as possible; in other words, under conditions which permit maximum expansion and therefore minimum consumption of foamable material. As the foamable material tends to expand to a greater degree of minimal pressure, it is usually undesirable to add the foamable material at a rate sufficiently high that in expanding it is required to move or raise large quantities of the foamable material. However, the rate of addition must be sufficient that the foamable hardenable material is in a sufficiently fluid condition that it expands and flows about the inner conduit such as the conduit 32 to provide a full hollow cylinder of foam material between the two conduits. If the rate of addition is too slow and insufficient material is provided, half or less of the annulus may be filled or a relatively narrow column of foam immediately below the nozzle will result.

In FIGURE 5, there is depicted a spacer generally designated by the reference numeral 70. The spacer 70 comprises an annular body 71 and a plurality of radially extending arms or spacing elements 72. The spacer 70 is particularly suited and adapted to be positioned over an inner conduit such as the conduit 32 to maintain a relatively fixed spaced relationship between the inner conduit and outer conduit. Such spacers might oftentimes be omitted in vertical or shallow well operations but are generally essential when horizontal lines are insulated and in deep wells. Beneficially, in insulation of horizontal lines, the conduits are assembled to a desired length incorporating a plurality of spacers and a messenger line disposed in the annular space between the conduits. The multiple passageway conduit of an apparatus such as the apparatus 10 may then be positioned with the aid of the messenger line and withdrawn at a rate suitable to the foaming components.

In FIGURE 6 there is depicted a sectional view of three generally concentric conduits 75, 76 and 77 wherein the conduit 77 is the inner conduit, 76 is the intermediate conduit and 75 is the outer conduit. An annular space 78 defined between the inner and intermediate conduits has disposed therein a hardened foamed plastic insulation generally designated by the reference numeral 79 and deposited by a multiple opening conduit 80.

In the practice of the method of the present invention and use of the apparatus thereof, any of the well known self-reacting, expanding, foam-forming, synthetic resinous liquid compositions may be employed such as the epoxy foam systems, polyurethane foaming systems and the phenolic foaming systems. In certain instances where relatively low temperatures are encountered, it is often desirable to preheat the foam components, which is readily accomplished utilizing a multiple passageway conduit such as the conduit of FIGURE 2 wherein an additional heat exchange fluid is circulated in a passageway or passageways adjacent the foam component passageways.

Beneficially, utilizing the method of an apparatus of the present invention, wells having a depth of many hundreds of feet and concentric conduits of great length may readily be insulated. Generally, however, in above-ground preparation where a conduit prior to being insulated is in a horizontal position, it is frequently desirable as a matter of operating convenience to provide the insulation in relatively short lengths; for example, insulation may be added at intervals of two or three hundred feet as the line is being constructed and the insulation terminated a sufficient distance from the terminal portion of the line under construction to permit welding without thermally damaging the foam.

As is apparent from the foregoing specification, the present invention is susceptible of being embodied with various alterations and modifications which may differ particularly from those that have been described in the preceding specification and description. Although the invention has been described with particular reference to the deposition of insulating foam in the concentric space separating conduits having circular cross-sections it should be understood that it is also applicable to the insulation of spaces having other shapes. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:

1. A method for the insulation of generally annular spaces defined between generally concentric pipe wherein a first pipe having an outer wall is disposed within a second pipe having an inner wall and a space is defined between the outer wall of the inner pipe and the inner wall of the outer pipe the length of the space being greater than 21 feet, the steps of the method comprising:

inserting in the space a mixing and discharge means, providing a first foam forming component and a second foam forming component, conveying the first and second foam forming components as separate streams to a mixing and discharge means, mixing the first and second components to form a formable hardenable composition, withdrawing the mixing and discharge means as foam forms and hardens, the rate of withdrawal of the mixing and discharge means being generally in accordance with the rate of formation of the foam within the space defined between the two pipes.

2. The method of claim 1 wherein the pipes are vertically disposed.

3. The method of claim 1 including the step of withdrawing the mixing and discharge means at a rate proportional to the rate of foam formation.

4. The method of claim 1 wherein the foam forming components provide a self-expanding synthetic resinous composition.

References Cited

UNITED STATES PATENTS

| 3,090,078 | 4/1963 | Ackles | 264—45 |
| 3,091,205 | 4/1963 | Watson | 264—45 |
| 3,242,240 | 3/1966 | Tantlinger | 264—45 |
| 3,366,718 | 1/1968 | Komada | 264—45 |

JULIUS FROME, *Primary Examiner.*

L. M. GARRETT, *Assistant Examiner.*

U.S. Cl. X.R.

61—72.2; 161—33; 264—47, 51